(12) United States Patent
Bae et al.

(10) Patent No.: US 9,166,698 B2
(45) Date of Patent: Oct. 20, 2015

(54) ELECTRONIC DISPERSION COMPENSATION FOR LOW-COST DISTRIBUTED FEEDBACK-DIRECTLY MODULATED LASER

(71) Applicant: Korea Advanced Institute of Science and Technology, Daejeon (KR)

(72) Inventors: HyeonMin Bae, Daejeon (KR); KyeongHa Kwon, Daejeon (KR); JongHyeok Yoon, Seoul (KR)

(73) Assignee: Korea Advanced Institute of Science and Technology, Yuseong-gu, Daejeon (KR)

( * ) Notice: Subject to any disclaimer, the term of this patent is extended or adjusted under 35 U.S.C. 154(b) by 121 days.

(21) Appl. No.: 14/053,447

(22) Filed: Oct. 14, 2013

(65) Prior Publication Data

US 2015/0104196 A1  Apr. 16, 2015

(51) Int. Cl.
*H04B 10/04* (2006.01)
*H04B 10/58* (2013.01)
*H04B 10/2513* (2013.01)

(52) U.S. Cl.
CPC .......... *H04B 10/58* (2013.01); *H04B 10/25137* (2013.01)

(58) Field of Classification Search
CPC ............. H04B 10/25073; H04B 10/25133; H04B 10/25137; H04B 10/697; H04B 10/58
See application file for complete search history.

(56) References Cited

U.S. PATENT DOCUMENTS

| 6,150,875 A * | 11/2000 | Tsinker .................. 327/552 |
| 7,672,595 B1 * | 3/2010 | McNicol et al. ........... 398/147 |
| 7,912,383 B2 * | 3/2011 | Cheng et al. ............. 398/210 |
| 2008/0226301 A1 * | 9/2008 | Alic et al. ................ 398/158 |
| 2011/0211842 A1 * | 9/2011 | Agazzi et al. ............ 398/141 |

* cited by examiner

*Primary Examiner* — Dzung Tran
(74) *Attorney, Agent, or Firm* — Christie, Parker & Hale, LLP

(57) ABSTRACT

Exemplary embodiments of the present invention relate to electronic dispersion compensation (EDC). The interaction between the frequency chirp and the fiber dispersion is newly analyzed. The linear and nonlinear properties of the chirp-dispersion are separately analyzed. A pre-compensating transmitter may consist of a phase interpolator (PI), a 2 tap data generator, a pulse widening CLK generator, a rising pattern detector, 4:1 Mux and an output driver. A post-compensating receiver may consist of linear equalizer for the rabbit ear compensation, nonlinear equalizer for tilting compensation, typical high frequency boosting equalizer (EQ) and limiting amp (LA).

12 Claims, 27 Drawing Sheets

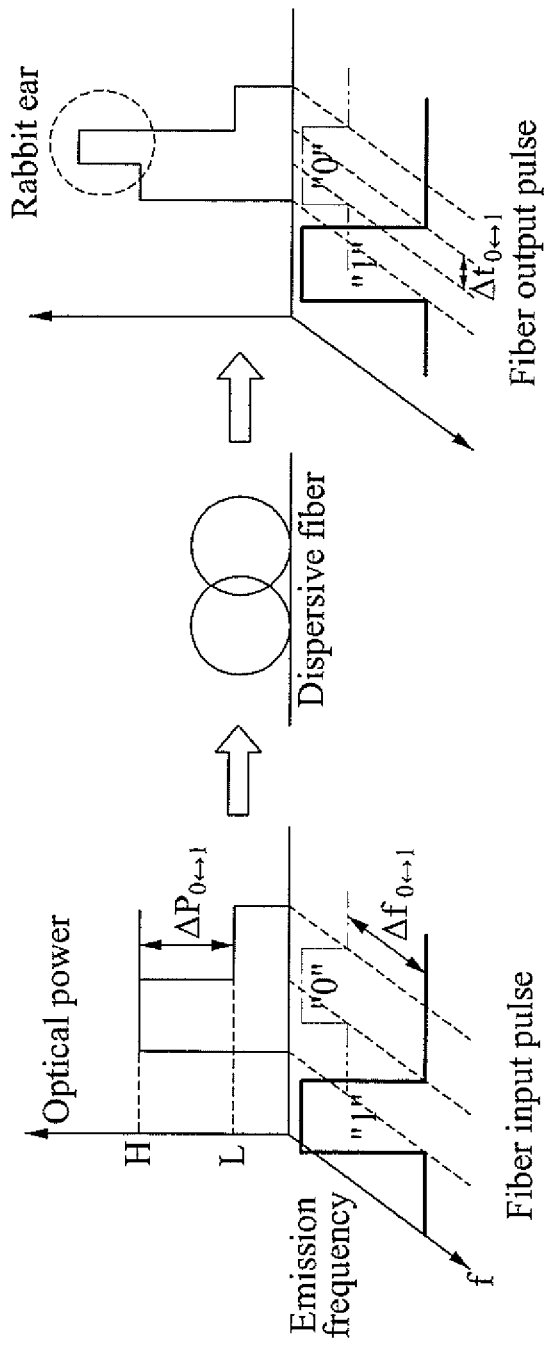

ELECTRONIC DISPERSION COMPENSATION FOR LOW-COST DISTRIBUTED FEEDBACK-DIRECTLY MODULATED LASER

BACKGROUND OF THE INVENTION

1. Field of the Invention

Exemplary embodiments of the present invention relate to a distributed feedback-directly modulated laser (DFB-DML).

2. Discussion of the Background

Recently, LTE backhaul is fast-growing market and the market is expected to support 100 million mobile devices by 2015. As the number of subscribers increases, efforts to decrease the cost per subscriber increase. A considerable portion of the cost is occupied by a laser source. Therefore, a low-cost distributed feedback-directly modulated laser (DFB-DML) is a good candidate for cost-effective optical networks. The DFB is a type of laser diode where an active region of the laser is periodically structured of diffraction grating. The grating provides optical feedback for the laser and reflects only a narrow band of wavelengths. Therefore, the DFB produces a single longitudinal lasing mode and has high Q-factor.

In comparison with externally modulated lasers (EMLs), the directly modulated lasers (DMLs) have many advantages of cost, power consumption and size. However, direct modulation induces frequency chirp. Over the data rate of 3 Gb/s, the frequency chirp combined with fiber dispersion degrades system performance. Therefore, several investigations have been conducted to compensate the penalty due to the frequency chirp. Some research have devised optical domain solutions such as specially designed chirp-managed lasers using optical spectrum reshaper (OSR) filter and dispersion compensation fiber (DCF).

SUMMARY OF THE INVENTION

An exemplary embodiment of the present invention discloses an electronic dispersion compensation (EDC) system for low-cost a distributed feedback-directly modulated laser (DFB-DML) comprising: a pre-compensating transmitter configured to transmit a signal with a reduced linear chirp-dispersion; and a post-compensating receiver configured to receive the signal and reduce a nonlinear chirp-dispersion.

The pre-compensating transmitter comprising: a 2 tap data generator configured to generate a main-tap data and a pre-tap data; a rising pattern detector configured to receive the pre-tap data and the main-tap data, and generate a detector signal; pre-drivers configured to adjust an amplitude of the detector signal according to an amount of pre-emphasis and subtract the detector signal from the main-tap data; and an output driver configured to generate an output data, wherein the output data is pre-emphasized before a rising edge.

The pre-tap data is 1-cycle earlier generated data than the main-tap data.

The pre-tap data is 0~1-cycle earlier generated data than the main-tap data. The cycle can be decided by the required duration of pre-emphasis according to laser chirp and fiber distance.

The detector signal is high when the main-tap data is low and the pre-tap data is high which means rising edge.

The rising pattern detector comprises, combinational logic configured to pre-emphasize the output data.

The pre-compensating transmitter further comprises, a pulse widening CLK generator configured to widen a pulse duration of at least one of the main-tap data and the pre-tap data.

The post-compensating receiver comprises, filters configured to compensate a tilting of the nonlinear chirp-dispersion.

The post-compensating receiver of EDC for low-cost a DFB-DML comprises a linear equalizer configured to compensate a linear chirp-dispersion; and a nonlinear equalizer configured to compensate a tilting of a nonlinear chirp-dispersion.

The linear equalizer comprises zero-pole filter, and the nonlinear equalizer comprises a multiplier, low pass filter, an 1Z-2P filter and an adder.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 shows the rabbit ear of a chirped pulse.

DETAILED OF THE ILLUSTRATED EMBODIMENTS

Figure 1A:
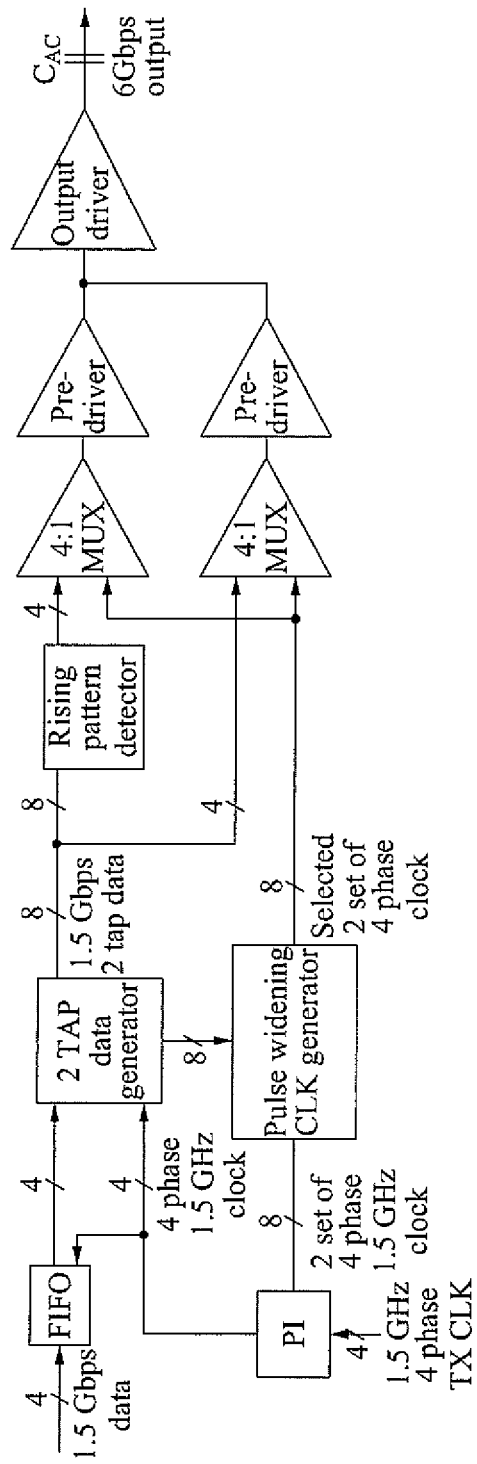
FIG. 1A and FIG. 1B show the architecture of the proposed electronic dispersion compensation (EDC) comprising pre-compensating transmitter and post-compensating receiver.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1B:
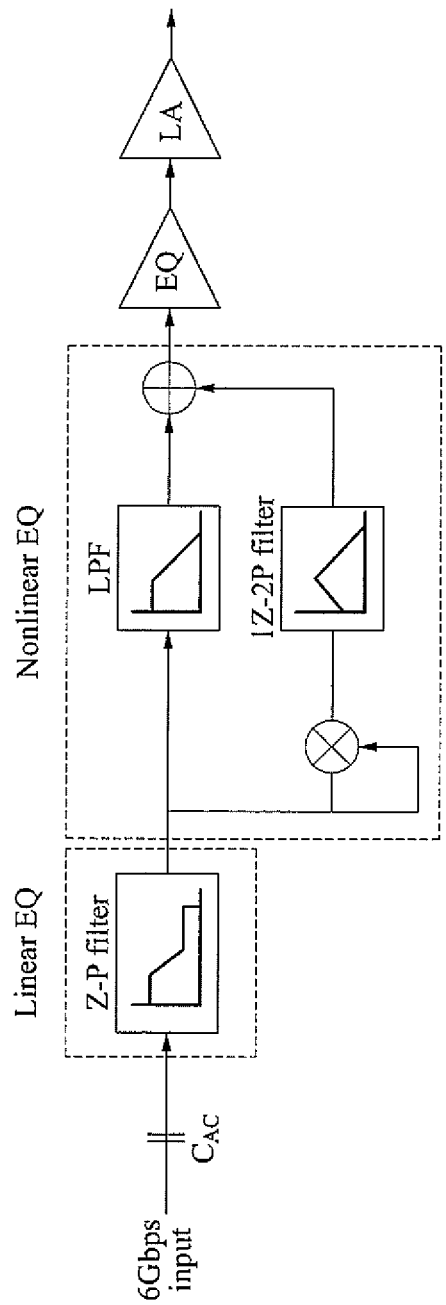

FIG. 1 shows the architecture of proposed electronic dispersion compensation (EDC). FIG. 1A shows a pre-compensating transmitter of the proposed EDC, and FIG. 1B shows a post-compensating receiver of the proposed EDC.

An optical domain approach may not be cost effective solution, since optical spectrum reshaper (OSR) and dispersion compensation fiber (DCF) may accompany the additional cost. In addition, the OSR may increases the size of directly modulated lasers (DMLs) and the DCF may increase a channel loss. Other research may devise electrical domain solutions such as EDC using feed-forward equalizer (FFE), decision feedback equalizer (DEE) and pre-compensation using look-up tables (LUT) for direct modulation.

The electrical domain approach may be cost-effective. However, these approaches have been devised to compensate fiber dispersion which means that these are not optimum solution for the chirp. In addition, there is no reasoning why the techniques can compensate the frequency chirp. Therefore, when the chirp is serious, the approaches may not compensate the chirp penalty.

An interaction between chirp and dispersion may be mathematically modeled. Based on the mathematical modeling, EDC for LTE backhaul at 6 Gb/s signal may be proposed. The proposed EDC may consist of pre-compensation at transmitter to reduce the chirp and post-compensation at receiver to completely eliminate the chirp penalty.

In accordance with an example of the present invention, the EDC system may reduce a chirp-dispersion. Direct current modulation may affect not only a laser output power but also emission frequency. A variation of emission frequency may be called a frequency chirp and be expressed by the following Equation 1.

$$\Delta f = \frac{\alpha}{4\pi}\left[\frac{d}{dt}(\ln(P_L(t)) + k_A P_L(t)\right] \quad \text{[Equation 1]}$$

wherein $\Delta f$ may be an instantaneous frequency deviation, $P_L(t)$ may be the laser output power (mW), $\alpha$ may be a line enhancement factor and $k_A$ may be an adiabatic chirp coefficient (GHz/mW). The values of $\alpha$ and $k_A$ may be different depending on a laser design and typical values may be respectively around 3 and around 20 GHz/mW. In the typical directly modulated lasers (DMLs), the adiabatic chirp may be dominant. Therefore, the frequency deviation chirp equation may be approximated as the following Equation 2.

$$\Delta f = \frac{\alpha k_A}{4\pi}P_L(t) = C_{chirp}P_L(t) \quad \text{[Equation 2]}$$

wherein $C_{chirp}$ may be chirp coefficient, for example, $$C_{chirp} = \frac{\alpha k_A}{4\pi}(\text{GHz/mW}).$$

In dispersive fiber, waves of different emission frequency may propagate at different speed. Therefore, the waves may interfere with each other which may cause signal distortion (for example, chirp-dispersion). Chirp-dispersion may be divided into linear chirp-dispersion, "rabbit ear", and nonlinear chirp-dispersion, "tilting". The interaction between the frequency chirp and fiber dispersion is newly analyzed. The linear and nonlinear properties of chirp-dispersion may be separately analyzed.

In accordance with an example of the present invention, the EDC system may comprise a pre-compensating transmitter, and a post-compensating receiver. Herein, the pre-compensating transmitter may transmit a signal with a reduced linear chirp-dispersion; and the post-compensating receiver may receive the signal and reduce a nonlinear chirp-dispersion.

The pre-compensating transmitter may consist of a phase interpolator (PI), a 2 tap data generator, a pulse widening CLK generator, a rising pattern detector, 4:1 Mux and an output driver. The rising pattern detector and pulse the widening CLK generator may be added to the typical transmitter. Pre-emphasis before rising-edge may reduce the rabbit ear and the pulse widening may raise low zero-crossing point due to the chirp.

The post-compensating receiver may consist of a linear equalizer (EQ) for rabbit ear compensation, nonlinear equalizer for tilting compensation, typical high frequency boosting equalizer and limiting amp (LA). For completely eliminating the rabbit ear, the rabbit ear may be modeled at receiver and the zero-pole filter may be designed from the mathematical model. The nonlinear chirp-dispersion, tilting, may be newly analyzed using Burger's equation and the nonlinear equalizer may be proposed.

For example, the nonlinear equalizer may consist of multiplier, low pass filter, one-zero two-pole filter (1Z-2P filter) and adder. All the poles and zeros may be positioned according to mathematical modeling. Frequency of zeros may be modulated by adjusting binary resistance to accommodate different kinds of low-cost directly modulated lasers (DMLs). By using the proposed EDC, reach extension for LTE backhaul may be possible from 3 Gbps to 6 Gbps and the cost of transmitter module for FTTH downstream may be reduced to 30%.

FIG. 2 shows the rabbit ear of a chirped pulse.

In accordance with an example of the present invention, FIG. 2 may show an analytical derivation of the linear chirp dispersion. The rabbit ear may be caused by an overlap between logic "0" and "1" as shown in FIG. 2. The rabbit ear may appear at a rising edge due to the overlapping between preceding "0" and following "1", and the rabbit ear may lead to overshoot at the rising edge. A differential delay between "0" and "1" may be calculated by using a material dispersion delay equation.

$$\Delta t = Dz\Delta\lambda = Dz\frac{\lambda_c^2}{c}\Delta f(\text{ps}) \quad \text{[Equation 3]}$$

Replacing the Equation 3 for the frequency deviation $\Delta f$ (GHz), as the above Equation 2, may obtain the following Equation 4.

$$\Delta t_{0\leftrightarrow 1} = Dz\frac{\lambda_c^2}{c}C_{chirp}\Delta P_{0\leftrightarrow 1} \quad \text{[Equation 4]}$$

wherein D may be a dispersion coefficient of fiber (ps/nm/km), z may be a length of fiber (km), $\lambda_c$ may be a center emission wavelength (nm) and c may be the speed of light.

Let d(t) be the original signal before traveling dispersive fiber. The signal may be composed of pulses for "1" and pulses for "0" such as d(t)=$d_0(t)$+$d_1(t)$. As d(t) may propagate the fiber, $d_1(t)$ may travel faster than $d_0(t)$ as much as $\Delta t_{0 \leftarrow \rightarrow 1}$. Therefore, the received signal may be represented by the following Equation 5.

$$r(t) = d_0(t) + d_1(t + \Delta t_{0 \leftarrow \rightarrow 1}) \quad \text{[Equation 5]}$$

wherein fiber attenuation and delay may be neglected because they do not change a pulse shape. Intuitively, $d_0(t)$ may be represented by $d_1(t)$ as the following Equation 6.

$$d_0(t) = L - \frac{1}{ER} \cdot d_1(t) \quad \text{[Equation 6]}$$

wherein ER may be the extinction ratio of the laser output power L (mW) for "0" and H for "1". By substituting the Equation 6 into the Equation 5, the Equation 5 may be written in the form with the following Equation 7.

$$r(t) = L - \frac{1}{ER} \cdot d_1(t) + d_1(t + \Delta t_{0 \leftrightarrow 1}) \quad \text{[Equation 7]}$$

Equation 7 may represent that the received signal may be the weighted sum of $d_1(t)$. From the Equation 7, $d_1(t)$ may be written in the form of the following Equation 8.

$$d_1(t) = \lim_{N \to \infty} \left\{ \sum_{k=0}^{N-1} \left( \frac{1}{ER} \right)^k [r(t - k \cdot \Delta t_{0 \leftrightarrow 1}) - L] \right\} \quad \text{[Equation 8]}$$
$$= \lim_{N \to \infty} \left\{ \sum_{k=0}^{N-1} \left( \frac{1}{ER} \right)^k r(t - k \cdot \Delta t_{0 \leftrightarrow 1}) \right\} - \frac{L}{1 - \frac{1}{ER}}$$

In case of $ER^2 \gg 1$, the Equation 8 may be simplified as given by the following Equation 9.

$$d_1(t) = r(t) + \frac{1}{ER} r(t - \Delta t_{0 \leftrightarrow 1}) - \frac{L}{1 - \frac{1}{ER}} \quad \text{[Equation 9]}$$

By using the Equation 9, the original signal may be obtained from the received signal shown as the following Equation 10.

$$d(t) = \quad \text{[Equation 10]}$$
$$\left(1 - \frac{1}{ER}\right) d_1(t) + L = \left(1 - \frac{1}{ER}\right) \left[ r(t) + \frac{1}{ER} r(t - \Delta t_{0 \leftrightarrow 1}) \right]$$

Figure 3A:
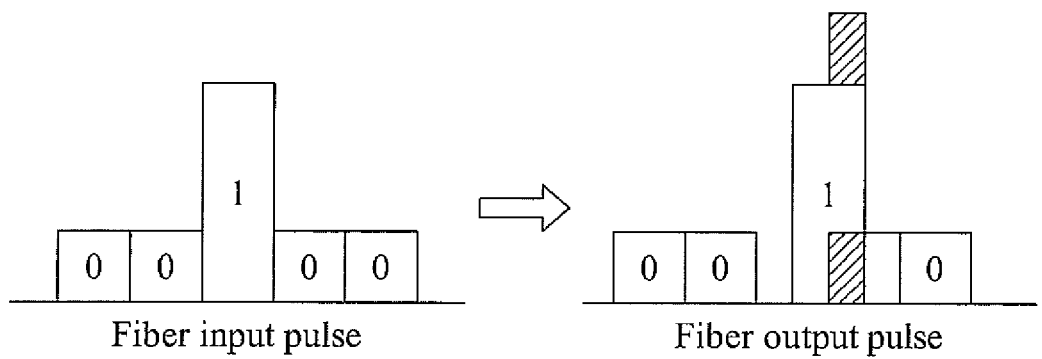
FIG. 3A and FIG. 3B show the rabbit ear at the pre-compensating transmitter.
Figure 3B:
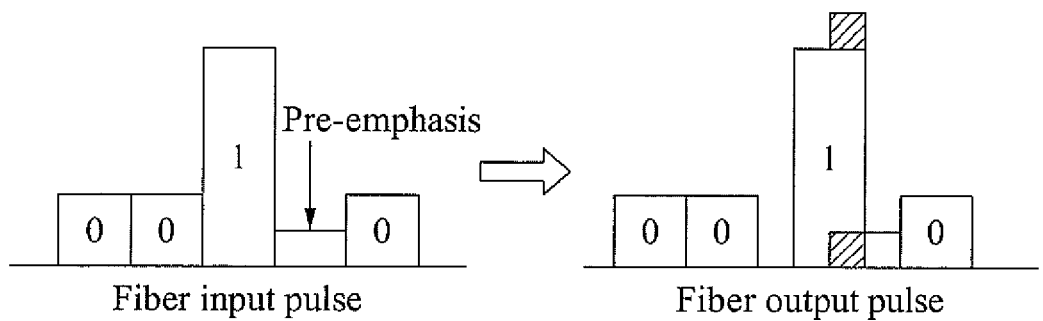

FIG. 3 shows the rabbit ear at the pre-compensating transmitter. FIG. 3A shows the rabbit ear without pulse-shaping, and FIG. 3B shows the rabbit ear with pulse-shaping at the transmitter.

In accordance with an example of the present invention, the proposed EDC may be applied for the linear chirp dispersion by the pre-compensation.

When the required laser output power is low, the laser output power for "0" may be also low and the overlapping may not matter. However, when the required laser output power may be high for long distance channel loss, the laser output power for "0" may be quite high and lead to big overshoot. The overshoot may not only distort the signal itself, but also lead to considerable degradation of circuits at the receiver. Therefore, a transmitter-side solution to reduce the rabbit ear may be necessary.

FIG. 3A shows the chirp-dispersed pulse without pulse shaping and FIG. 3B shows the chirp-dispersed pulse with pulse shaping for 1 UI before the rising edge. Pulse-shaping may make the transmitted signal better suitable to reduce the rabbit ear. Pre-emphasis during $\Delta t_{0 \leftarrow \rightarrow 1}$ before the rising edge may reduce the rabbit ear. FIG. 3B may show the pre-emphasis before the rising edge to make smaller rabbit ear. However, the pre-emphasis before the rising edge may have limitation. To sustain stable turn-on for the DML, the power for preceding "0" at the rising edge may not be zero. It may mean that the rabbit ear can't be entirely eliminated by using the pulse-shaping method. Thus, a receiver-side solution may be needed to eliminate the rabbit ear.

The fiber dispersion may make the zero-crossing of an eye diagram of the received signal be lower. In addition, the tilting due to the chirp may additionally lower the zero-crossing which degrades optimum point sampling at the receiver. Therefore, a pulse widening technique may be added to raise the zero-crossing point.

FIG. 4 is a view illustrating an example of the process of the rabbit ear compensation according to an exemplary embodiment of the present invention.

In accordance with an example of the present invention, the post-compensation corresponding to the rabbit ear compensation may be shown as FIG. 4. From the Equation 10, the original data at t may be calculated from the weighted sum of the received signal at t and the past received signal at $t - \Delta t_{0 \leftarrow \rightarrow 1}$ as shown in FIG. 4.

Figure 4A:
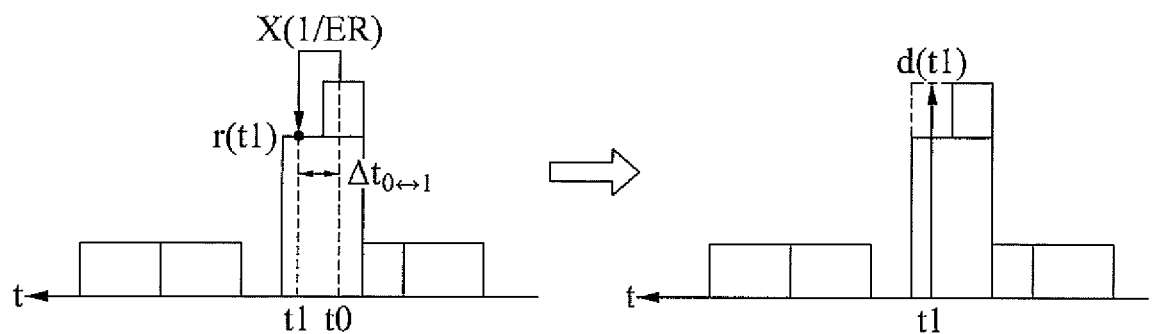
FIG. 4A and FIG. 4B show a view illustrating an example of the process of the rabbit ear compensation according to an exemplary embodiment of the present invention.
Figure 4B:
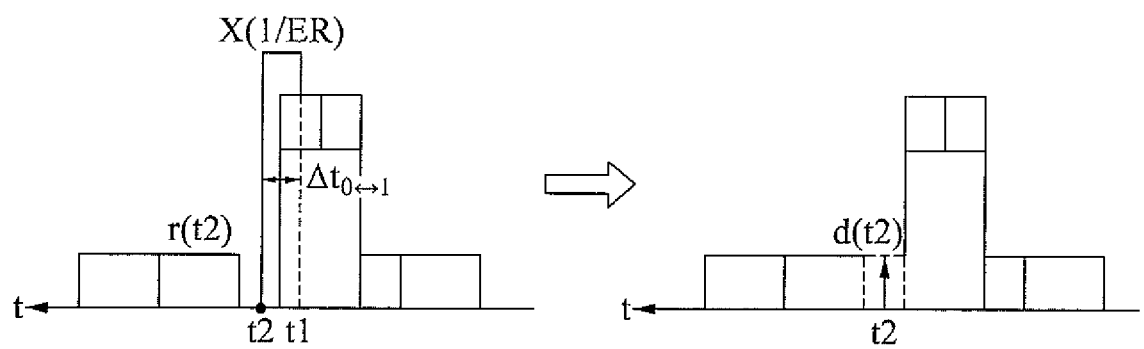

FIG. 4 may show the illustration of the process of the rabbit ear compensation using the Equation 10. FIG. 4A may show that $d(t1)$ is compensated from the weighted sum of $r(t1)$ and $r(t - \Delta t_{0 \leftarrow \rightarrow 1})$ which eliminates the rabbit ear. FIG. 4B may show that $d(t2)$ is compensated from the weighted sum of $r(t2)$ and $r(t2 - \Delta t_{0 \leftarrow \rightarrow 1})$ which fills the hole due to the early arrived "1".

By using Fourier transform, the Equation 10 may be transformed as the form of the following Equation 11.

$$D(s) = \left(1 - \frac{1}{ER}\right)\left[R(s) + \frac{1}{ER}\exp(-s\Delta t_{0 \leftrightarrow 1})R(s)\right] \quad \text{[Equation 11]}$$

wherein $D(s)$ may be the Fourier transform of $d(t)$ and $R(s)$ may be the Fourier transform of $r(t)$. Since $\Delta t_{0 \leftarrow \rightarrow 1}$ is very small, $\exp(-s\Delta t_{0 \leftarrow \rightarrow 1})$ may be approximated as the following Equation 12.

$$\exp(-s t_{0 \leftrightarrow 1}) = \frac{1 - \frac{s \Delta t_{0 \leftrightarrow 1}}{2}}{1 + \frac{s \Delta t_{0 \leftrightarrow 1}}{2}} \quad \text{[Equation 12]}$$

Using the Equation 11 and the approximated Equation 12, the linear equalizer for mitigating the rabbit ear may be represented by the following Equation 13.

$$H_{lin} = \quad \text{[Equation 13]}$$
$$\frac{D(s)}{R(s)} = \left(1 - \frac{1}{ER}\right)\left[1 + \frac{1}{ER}\frac{1 - \frac{s\Delta t_{0 \leftrightarrow 1}}{2}}{1 + \frac{s\Delta t_{0 \leftrightarrow 1}}{2}}\right] = \left(1 - \frac{2}{ER}\right)\frac{s+z}{s+p}$$

wherein the pole and zero frequency (GHz) may be represented by the following Equation 14.

$$p = \frac{1}{\pi \Delta t_{0 \leftrightarrow 1}},$$
$$z = \frac{ER+1}{ER-1} \cdot \frac{1}{\pi \Delta t_{0 \leftrightarrow 1}}$$

[Equation 14]

Figure 5A:
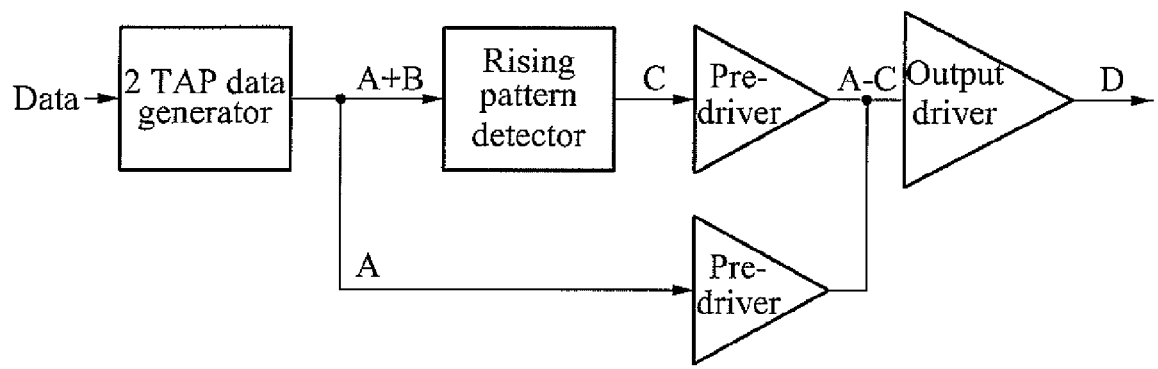
FIG. 5A through FIG. 5C show a view illustrating an example of the simplified block diagram used for pre-emphasis before a rising edge according to an exemplary embodiment of the present invention.
Figure 5B:
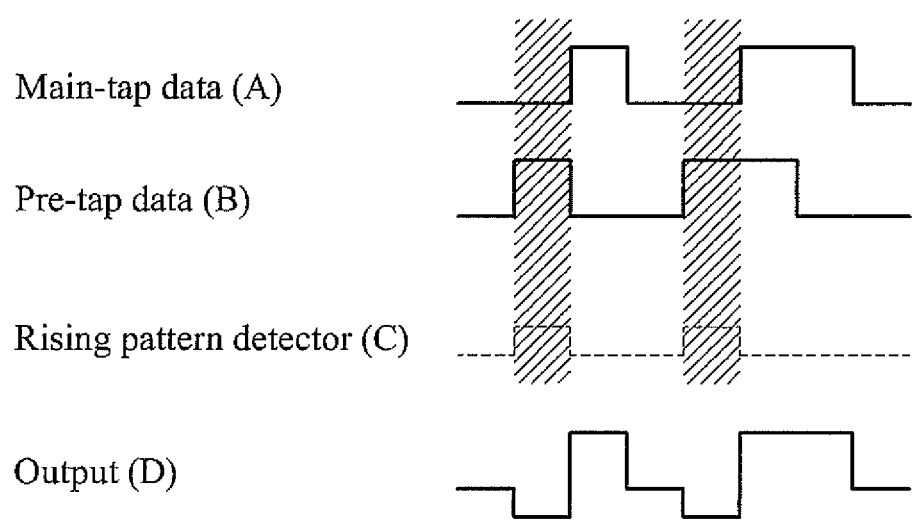

FIG. 5 is a view illustrating an example of the simplified block diagram used for pre-emphasis before a rising edge according to an exemplary embodiment of the present invention. FIG. 5A shows the simplified block diagram used for pre-emphasis before the rising edge, and FIG. 5B shows the illustration of the data modification.

A 2 tap data generator may generate a main-tap data (for example, A) and a pre-tap data (for example, B). The pre-tap data may be a predetermined cycle earlier generated data than the main-tap data. Herein, the predetermined cycle may be more than 0-cycle, and less-than-or-equal to 1-cycle. For example, the pre-tap data may be 0.5-cycle earlier generated data than the main-tap data. For another example, the pre-tap data may be 1-cycle earlier generated data than the main-tap data as shown in FIG. 5B.

A Rising pattern detector may receive the pre-tap data and the main-tap data, and generate a detector signal (for example, C) which is high when the main-tap data is low and the pre-tap data is high.

Pre-drivers may adjust amplitude of the detector signal according to an amount of pre-emphasis and subtract the detector signal from the main-tap data. For example, a first pre-driver may adjust the amplitude of the detector signal according to the amount of pre-emphasis, and a second pre-driver may subtract the detector signal from the main-tap data. Thus, an output data (for example, D) may be pre-emphasized only before the rising edge, wherein an output driver may generate the output data.

Figure 5C:
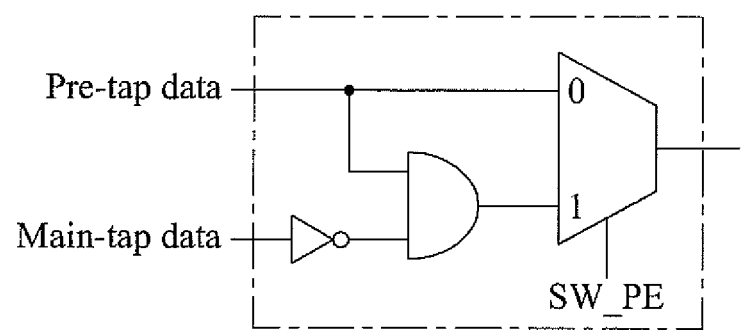

The rising pattern detector may consist of a combinational logic to pre-emphasize the output data shown in FIG. 5C. The output of AND gate may become high, when main-tap data is low and pre-tap data is high, which means the rising edge. When the pre-emphasis before rising switch (SW_PR) is low, the rising pattern detector may generate the pre-tap data. Then, the output of transmitter may become typical pre-emphasized data. When SW_PR is high, rising pattern detector may generate the rising detector signal. Then, the output may become pre-emphasized data only before the rising edge.

FIG. 6 is a view illustrating an example of the simplified block diagram used for pulse-widening according to an exemplary embodiment of the present invention. FIG. 6A shows the simplified block diagram used for pulse-widening. According to the data patterns, CLK to 4:1 mux may be adjusted to widen the pulse width. FIG. 6B and FIG. 6C shows the illustration of the CLK modification process.

Figure 6A:
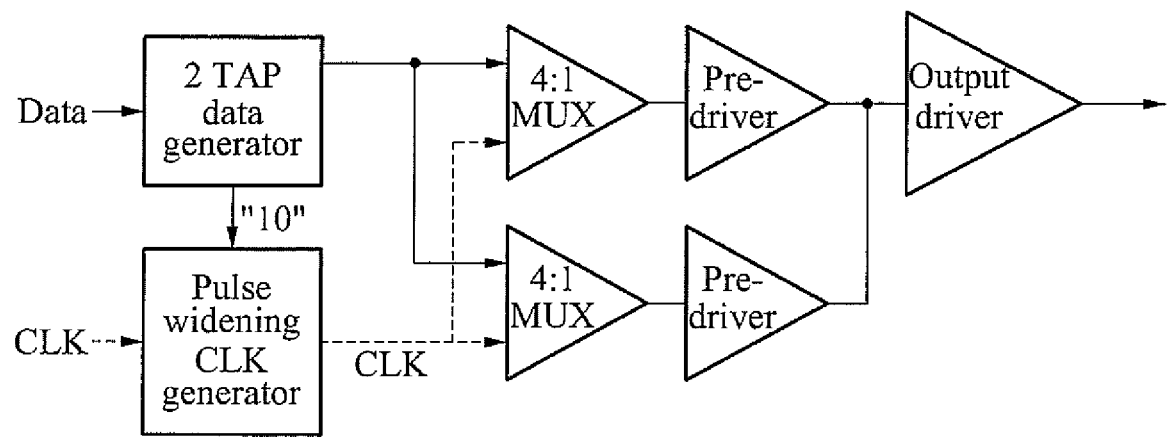
FIG. 6A through FIG. 6D show a view illustrating an example of the simplified block diagram used for pulse-widening according to an exemplary embodiment of the present invention.
Figure 6B:
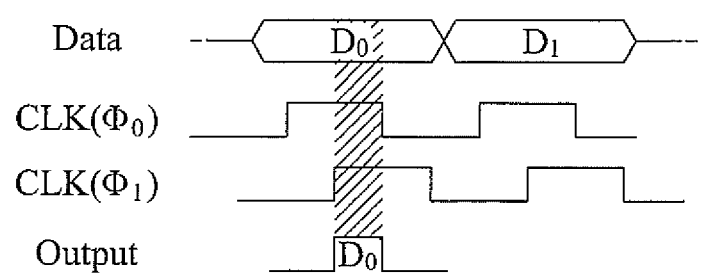

In normal operation, $CLK(\phi_1)$ may be $$\frac{\pi}{2}$$

later than $CLK(\phi_0)$. During $CLK(\phi_0)$ and $CLK(\phi_1)$ are both high, the data may be captured as shown in FIG. 6B. However, when a pulse widening CLK generator detects "10" patterns from 2 tap data generator, $CLK(\phi_0)$ may be adjusted to CLK $(\phi_0')$ which is late as much as the amount of pulse-widening.

Figure 6C:
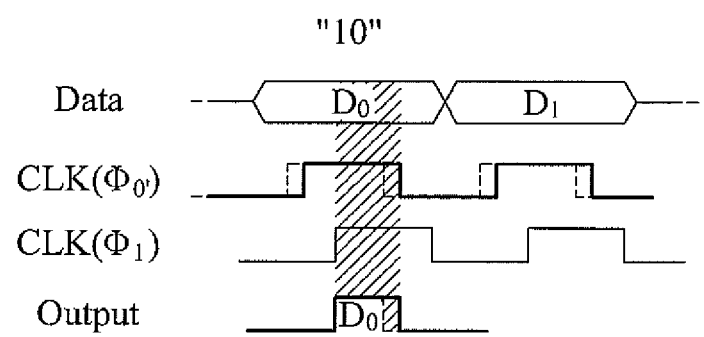

In consequence, as the time, during $CLK(\phi_0)$ and $CLK(\phi_1)$ being both high, increases, the data "1" may be widened as shown in FIG. 6C.

Figure 6D:
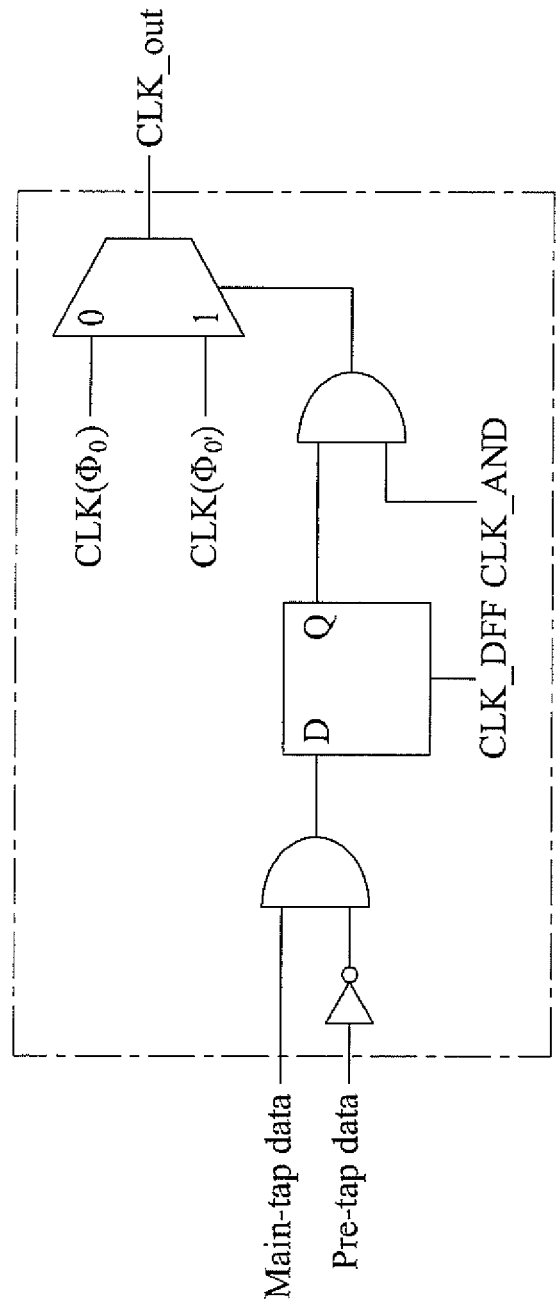

The pulse widening CLK generator may widen a pulse duration of at least one of the main-tap data and the pre-tap data. For example, the pulse widening CLK generator may consist of combinational logic, D flip-flop and 2:1 MUX as shown in FIG. 6D. The output of AND gate may become high when main-tap data is high and pre-tap data is low, which means a falling edge.

Then, the output of AND gate may be sampled by D flip-flop. The 2:1 MUX may pass $CLK(\phi_0)$ in normal state. When the falling edge is detected by the domino AND, the MUX may pass $CLK(\phi_1)$. The duration, for which $CLK(\phi_0')$ is passed, may be decided by CLK_AND. To pass the $CLK(\phi_0')$ for half period of CLK, domino AND gate may be used. By using the final CLK_out, pulse duration for "1" may be widened.

Figure 7:
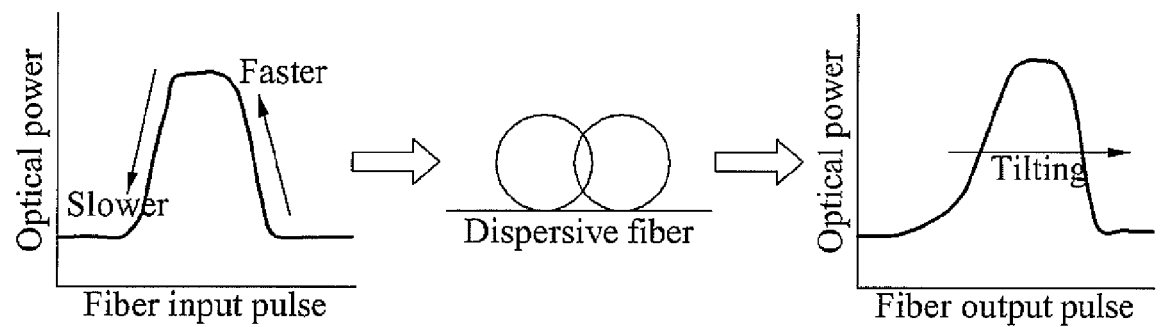
FIG. 7 is a view illustration an example of the tilting of chirped pulse according to an exemplary embodiment of the present invention.

FIG. 7 is a view illustration an example of the tilting of chirped pulse according to an exemplary embodiment of the present invention.

In accordance with an example of the present invention, a nonlinear chirp dispersion may be analytically derived as shown in FIG. 7. The tilting may be caused by the logic "1"s at pulse edge. At the rising edge, as the laser output power increases, the emitted frequency may increase proportionally. Thus, the subsequent pieces of the rising edge may propagate faster and the fiber output pulse may rise faster than the fiber input pulse. Likewise, the subsequent pieces of the falling edge may propagate slower, and the fiber output pulse may fall slower than the fiber input pulse. Therefore, the fiber output pulse may be tilted forward as shown in FIG. 7.

Figure 8A:
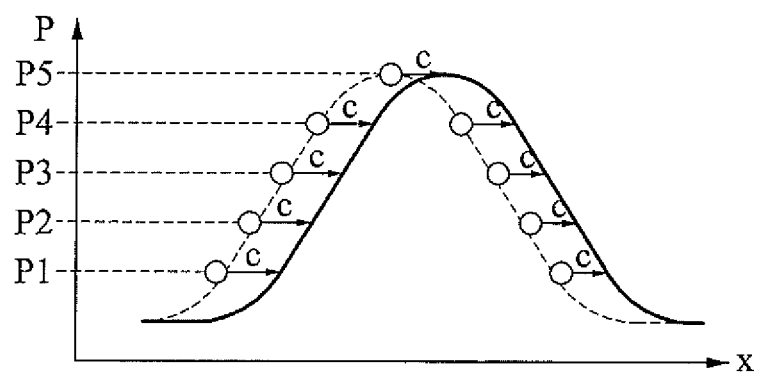
FIG. 8A and FIG. 8B show a motion of particles according to an exemplary embodiment of the present invention.
Figure 8B:
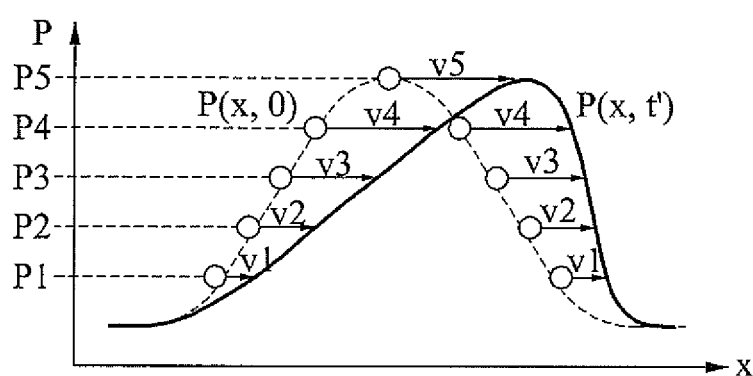

FIG. 8 is a view illustration an example of a motion of particles according to an exemplary embodiment of the present invention. FIG. 8A shows the motion of particles with same velocity, and FIG. 8B shows the motion of particles with high velocity according to their power.

Burger's equation may be used to model the tilting of the chirped pulse. Burger's equation may describe the motion of an one-dimensional stream of particles such as the phenomenon of turbulence. Let P(x,t) be a power fields: t may denote time, and x may denote position at time t. Then, P(x,t) may denote the power of the particle at position x at time t. Each particle may sustain its power. For a particle at position x(t) at time t, P(x(t),t) may be constant. By partial differentiation P(x(t),t) with respect to t, quasi-linear equation may be obtained, which is called Burger's equation.

$$\frac{dP}{dt} + v\frac{dP}{dx} = 0,$$
$$v = \frac{dx}{dt}$$

[Equation 15]

wherein v may be the velocity of the particles toward x.

Consider the following pulse, $P(x,0)=1-\cos(x)$. In case of v(x,t)=c which means that a stream of particles may have same constant velocity (for example, c), the Equation 15 may be represented by the following Equation 16.

$$\frac{dP}{dt} + c\frac{dP}{dx} = 0$$

[Equation 16]

In this case, the motion of the stream of the particles may be shown in FIG. 8A. Since the particles have same velocity, the pulse may move forward simultaneously and the shape of the pulse mays not change after t'.

In case of v(x,t)=αP(x,0), which means the stream of the particles have different velocity proportional to their power, the Equation 15 may be represented by the following Equation 17.

$$\frac{dP}{dt} + \alpha P \frac{dP}{dx} = 0 \quad (17)$$

In this case, the motion of the stream of the particles may be shown in FIG. 8B. As the power of a particle is bigger, the particle may move faster. After t', the stream of the particles may be tilted forward like the chirp-dispersed pulse. Therefore, the tilting of the chirp-dispersed pulse may be modeled by the Burger's equation In dispersive fiber, the particles emitted from DMLs may have different velocity according to their power. The relation between the velocity and the power may be calculated.

Suppose particles, which have power for "0", may be emitted at center wavelength, $\lambda_c$ and propagate at the speed of light, c. Let the relative velocity to the particles for "0" be $\Delta v$, the differential delay after fiber may be expressed by the following Equation 18.

$$\Delta t = \frac{z}{c} - \frac{z}{c+\Delta v} = \frac{z}{c^2}\Delta v \quad \text{[Equation 18]}$$

By substituting the Equation 18 into the Equation 4, the relation between $\Delta v$ and $\Delta P$ may be represented by the following Equation 19.

$$\Delta v = \alpha \Delta P \quad \text{[Equation 19]}$$

wherein $\alpha = Dc\lambda_c^2 C_{chirp}$.

In consequence, the tilting equation may take the form of the following Equation 20.

$$\frac{dP}{dt} + (c + \alpha(P-L))\frac{dP}{dx} = 0 \quad \text{[Equation 20]}$$

wherein c may be the velocity at P=L, laser output power for "0".

FIG. 9 shows the concepts of the EDC for tilting. In accordance with an example of the present invention, the proposed EDC may compensate the nonlinear chirp dispersion as shown below.

Figure 9A:
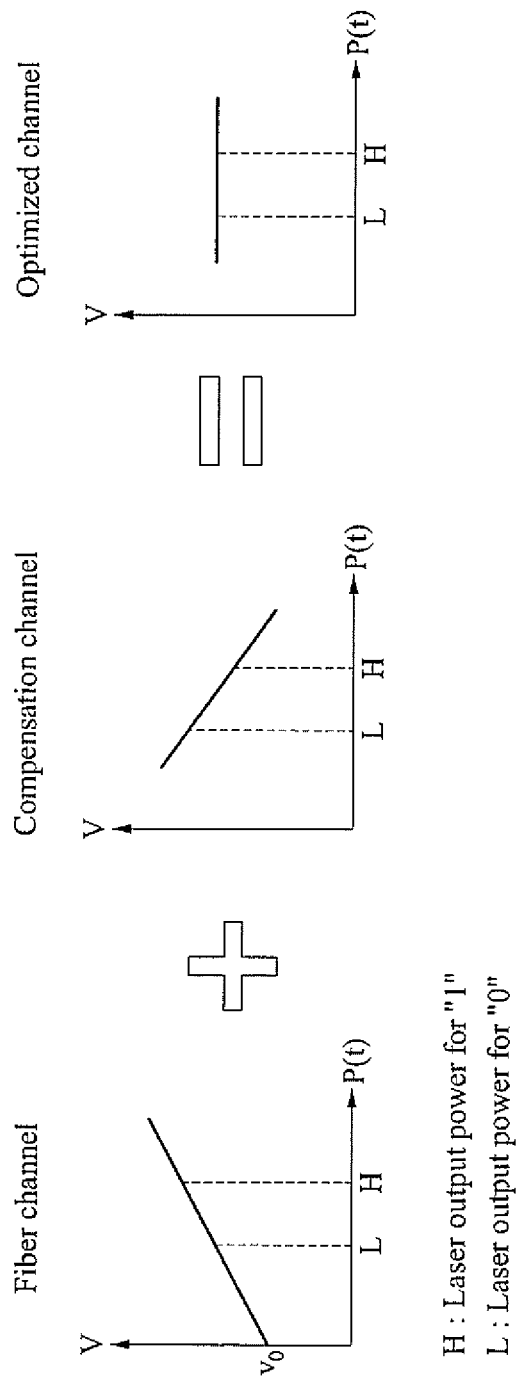
FIG. 9A and FIG. 9B show the concepts of the EDC for tilting.

To compensate the tilting, compensation channel, in which the velocity of a particle is inversely proportional to the power of the particle as shown in FIG. 9A, may be needed. After passing the fiber and compensation channel, all the particles, which have different power, may have same average velocity.

From tilting equation, which is the Equation 20, the tilting compensation equation may have to take the form of the following Equation 21.

$$\frac{dP}{dt} + \beta(H + L - P)\frac{dP}{dx} = 0 \quad \text{[Equation 21]}$$

In compensation channel, the particle with power H (mW) may propagate with velocity, βL, and analogously, the particle with power L may propagate with velocity, βH. By adjusting β as proper value, the particle with power L may arrive at the same time with the particle with power H.

Figure 9B:
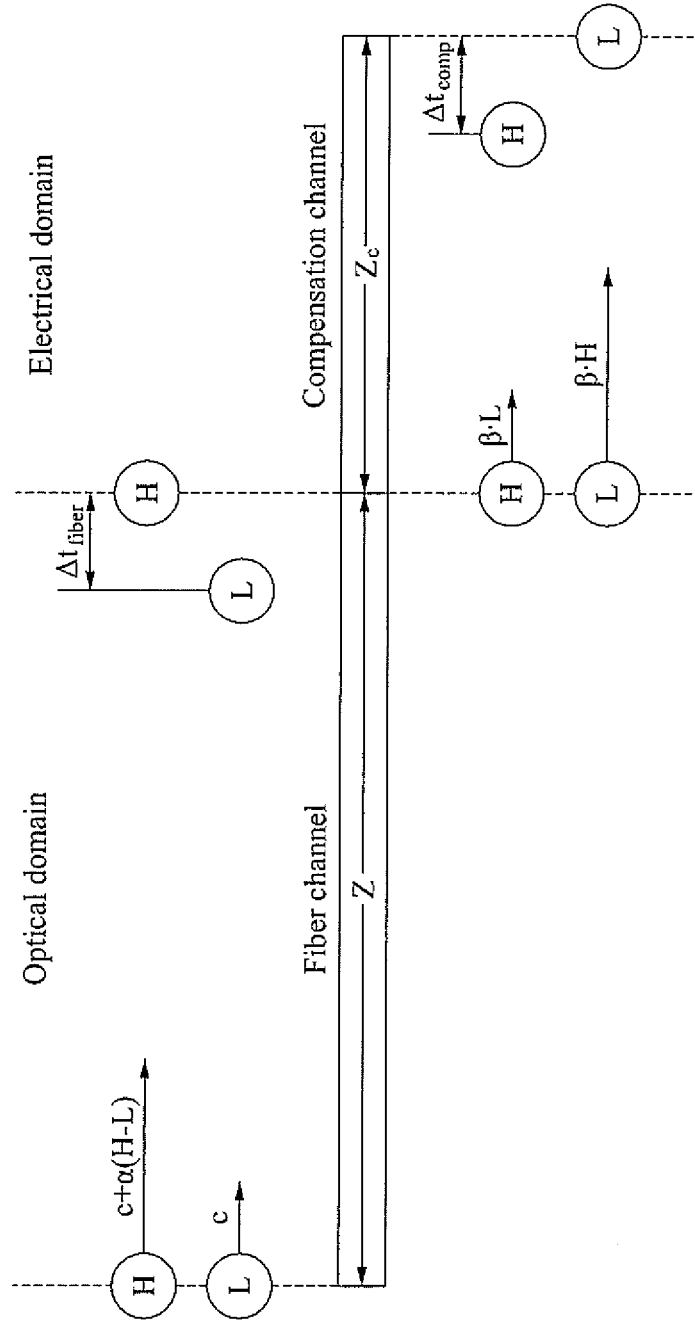

It may be supposed that a particle with power H and another particle with power L propagate the z length fiber and $z_c$ length compensation channel as shown in FIG. 9B. By using the Equation 4, the differential delay between the particles after fiber may be expressed by the following Equation 22.

$$\Delta t_{fiber} = Dz\frac{\lambda_c^2}{c}C_{chirp}(H-L) \quad \text{[Equation 22]}$$

The differential delay between the particles after the compensation channel may be expressed by the following Equation 23.

$$\Delta t_{comp} = \frac{z_c}{\beta L} - \frac{z_c}{\beta H} = \frac{z_c(H-L)}{\beta HL} \quad \text{[Equation 23]}$$

To make the particles have same average velocity, $\Delta t_{fiber}$ may have to be equal to $\Delta t_{comp}$. By letting the Equation 22 be equal to the Equation 23, β is decided by the following Equation 24.

$$\beta = \frac{z_c}{z} \frac{c}{HLDC_{chirp}\lambda_c^2} \quad \text{[Equation 24]}$$

Until now, signal attenuation and amplification may have been neglected. In real system, the power of the particles at compensation channel may not same as the initial power of the particles at fiber channel. Fiber attenuation, photo detector (PD) responsivity and transimpedance amplifier (TIA) gain may change the power.

It may be supposed that the power H becomes □H and analogously the power L becomes □H due to the attenuation and amplification. Then the Equation 21 may be changed to the form of the following Equation 25.

$$\frac{dP}{dt} + \beta\left(H + L - \frac{P}{a}\right)\frac{dP}{dx} = 0 \quad \text{[Equation 25]}$$

wherein β may be same as the Equation 24 and □ may be calculated from the component parameters, or □ may be simply measured using a power detector. By using spatial quantization and backward Euler method, the Equation 25 may be expressed by the Equation 26.

$$\frac{dP_o}{dt} + \beta\left(H + L - \frac{P_i}{a}\right)\frac{P_o - P_i}{\Delta} = 0 \quad \text{[Equation 26]}$$

wherein $$\Delta = \frac{z_c}{N_{st}},$$

and $P_i$ and $P_o$ may be respectively the input and output pulse of the spatial quantized compensation channel, $\Delta$ and $N_{st}$ may be the number of the $\Delta$ channel.

Equation 26 may be weakly nonlinear equation, and the Volterra series expansion may be widely used for nonlinear system representation. To represent the relationship between $P_i$ and $P_o$, 2nd order Volterra series expansion, which is the following Equation 27, may be used.

$$P_o(t) = H_o \circ P_i(t) + H_1 \circ P_i^2(t) \qquad \text{[Equation 27]}$$

wherein the Volterra operator $\circ$ may mean that the amplitude and phase of $P_i^n(t)$ are modified by the amplitude and the phase of $H_n(s)$. By using the Fourier transform and substituting the Equation 27 into the Equation 26, the Equation 26 may be expressed by the following Equation 28.

$$s(H_o \circ P_i(t) + H_1 \circ P_i^2(t)) + \beta\left(H + L - \frac{P_i}{a}\right)\left(\frac{H_o \circ P_i(t) + H_1 \circ P_i^2(t) - P_i}{\Delta}\right) = 0 \qquad \text{[Equation 28]}$$

The following Equation 29 may be derived from the Equation 28 according to ascending order of $P_i$.

$$[H_o\{s\Delta + \beta(H+L)\} - \beta(H+L)] \circ P_i(t) + \left[H_1\{s\Delta + \beta(H+L)\} + \frac{\beta}{a}(1 - H_o)\right] \circ P_i^2(t) = 0 \qquad \text{[Equation 29]}$$

By using the coefficient comparison, $H_n(s)$ may be obtained as the following Equation 30.

$$H_o = \frac{\beta(H+L)}{s\Delta + \beta(H+L)}, \quad H_1 = -\frac{\beta}{a}\frac{s\Delta}{(s\Delta + \beta(H+L))^2} \qquad \text{[Equation 30]}$$

By transforming the Equation 30 into zerp-pole filter form, the Equation 30 may be expressed by the following Equation 31.

$$H_o = \frac{p_c}{s + p_c}, \quad H_1 = -\frac{p_c}{a(H+L)}\frac{s + z_c}{(s + p_c)^2} \qquad \text{[Equation 31]}$$

wherein the pole and zero are represented by the following Equation 32.

$$p_c = \frac{\beta(H+L)}{\Delta} = \frac{N_{st}}{z}\frac{c(H+L)}{HLDC_{chirp}\lambda_c^2}, \quad z_c = 0 \qquad \text{[Equation 32]}$$

In consequence, the tilting compensation equation takes the form of the following Equation 33.

$$P_o(t) = \left[\frac{p_c}{s + p_c}\right] \circ P_i(t) - \frac{p_c}{a(H+L)}\left[\frac{s + z_c}{(s + p_c)^2}\right] \circ P_i^2(t) \qquad \text{[Equation 33]}$$

Figure 10:
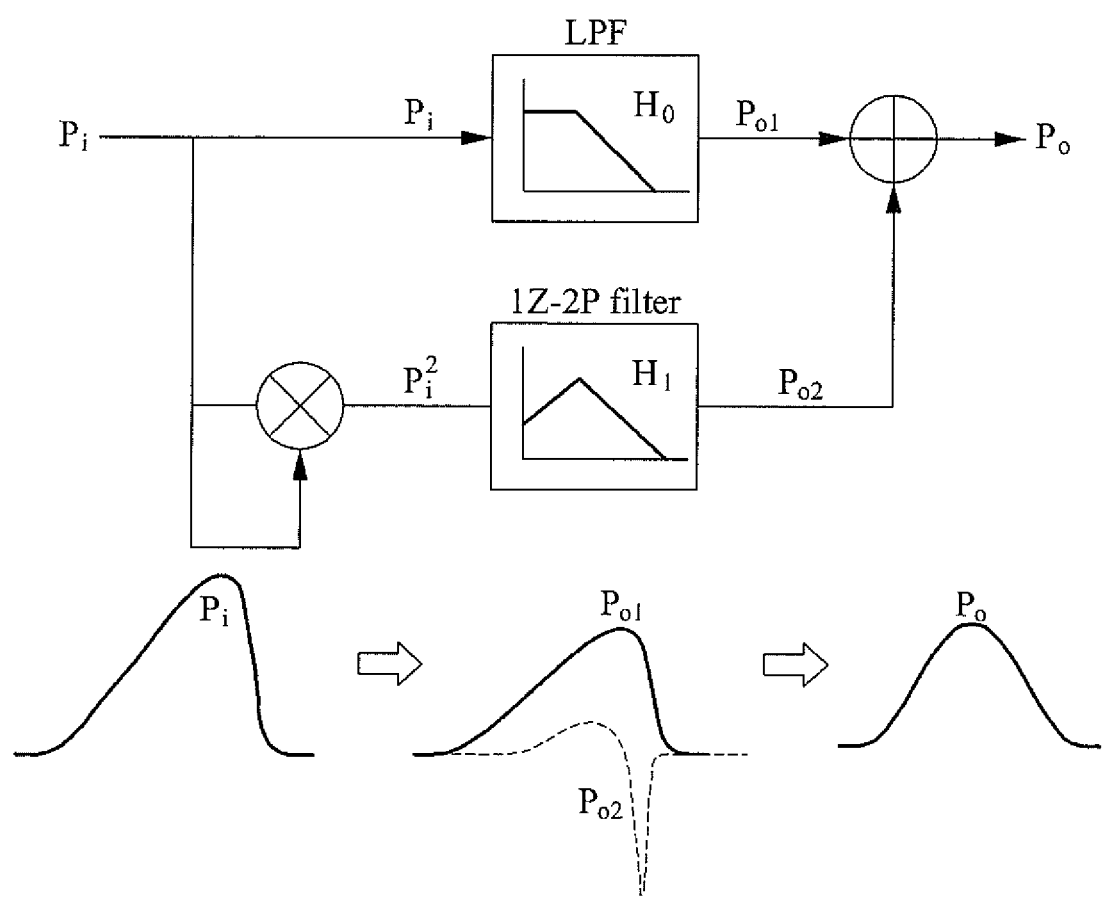
FIG. 10 shows the process of tilting compensation.

FIG. 10 shows the process of tilting compensation.

In accordance with an example of the present invention, filters of the post-compensating receiver may compensate the tilting of the nonlinear chirp-dispersion according to above equations, wherein the filters may comprise a low pass filter and an one-zero two-pole filter (1Z-2P filter).

In FIG. 10, $P_{o1}$ may be simply low passed pulse of $P_i$, and $P_{o2}$ may be the dashed line which is proportional to $$-\frac{dP_i}{dt}P_i$$

due to the zero frequency at 0 Hz which takes a role of differentiator. At the summer, the tilting part of $P_{o1}$ may be compensated by $P_{o2}$. In consequence, the standing straight pulse, $P_o$, may be obtained. Using this nonlinear process, the tilting of the chirp-dispersed pulse may be compensated. The 1Z-2P filter may pass $P_i^2$ to $P_o$ for compensating $P_{o1}$.

In accordance with an example of the present invention, simulation parameters may be set-up as shown below.

For example, to drive the DML, 6 Gb/s modulation signals with a non-return-to-zero format may be used. For the optical components such as laser driver, the fiber and the photo detector (PD), the Optsim simulator may be used. For example, the DFB-DML model may be implemented based on Fujitsu's 5F10NP laser diode in the Optsim and adjusted by a laser parameters. To verify the performance of EDC in high chirp-dispersion, the values of K may be raised to have 0.35 nm wavelength difference between the "1"s and the "0"s. The spectrum of the designed DML may have two distinct peaks, corresponding to the "1" and the "0"s. As a result, the designed laser may have 17.5 GHz/mW as the chirp coefficient. For the set-up for the chirp-dispersion effect, 40 km standard single mode fiber (SSMF) with a dispersion coefficient of D=16 ps/km/nm may be used. After fiber links, the PD, a bessel electrical LPF with a 3 dB bandwidth of 0.75 times the bit rate and the TIA may be applied before equalizer. EDC may be implemented in Cadence tool.

FIG. 11 shows the simulation result of the eye diagram at transmitter output.

Figure 11A:
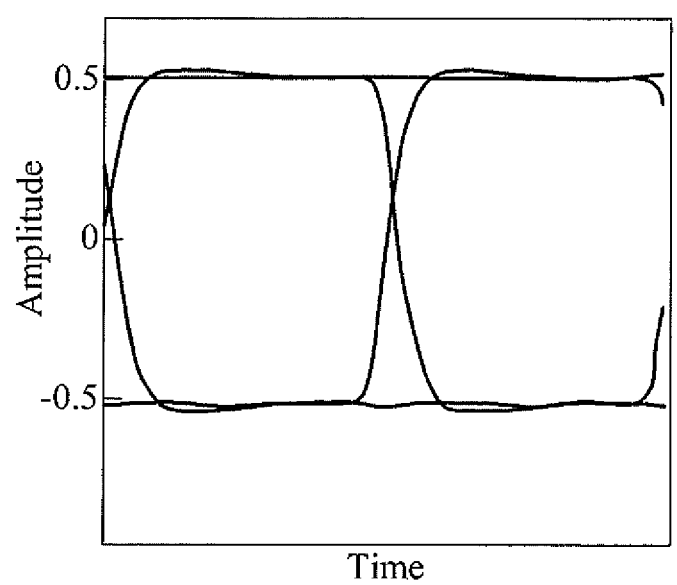
FIG. 11A through FIG. 11C show the simulation result of the eye diagram at transmitter output.
Figure 11B:
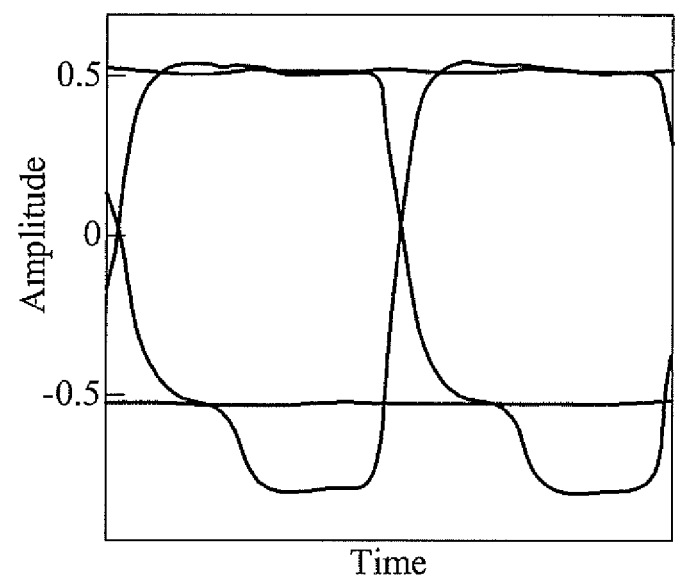
Figure 11C:
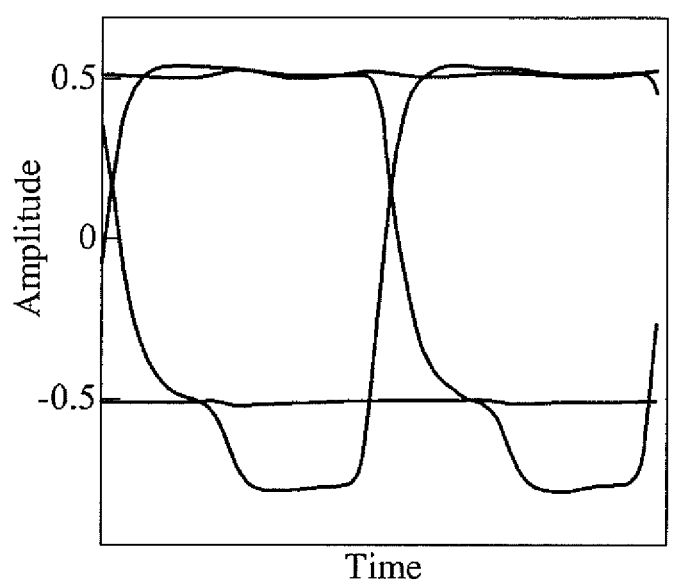

FIG. 11A shows the eye diagram when the pulse widening block is active. FIG. 11B shows the eye diagram when the pre-emphasis block is active. FIG. 11C shows the eye diagram when the both blocks are active. The eye diagram shows that the pre-compensation of transmitter properly operates.

Figure 12A:
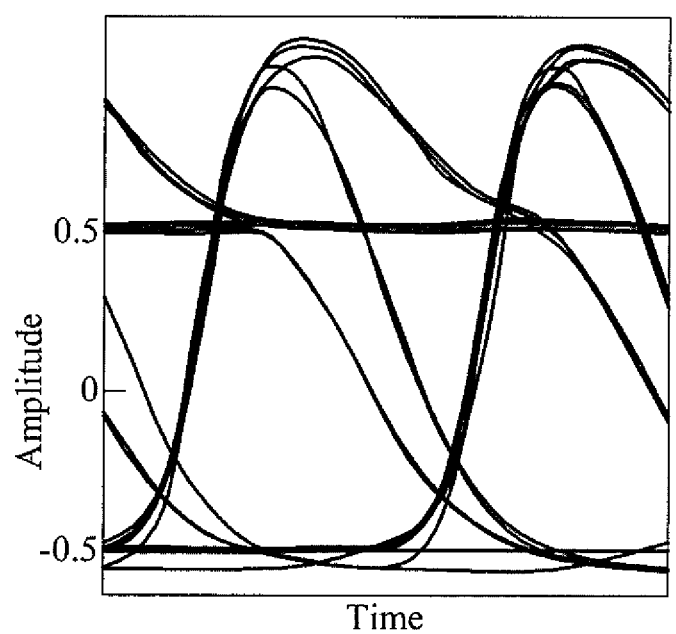
FIG. 12A shows the eye diagram without compensation.
Figure 12B:
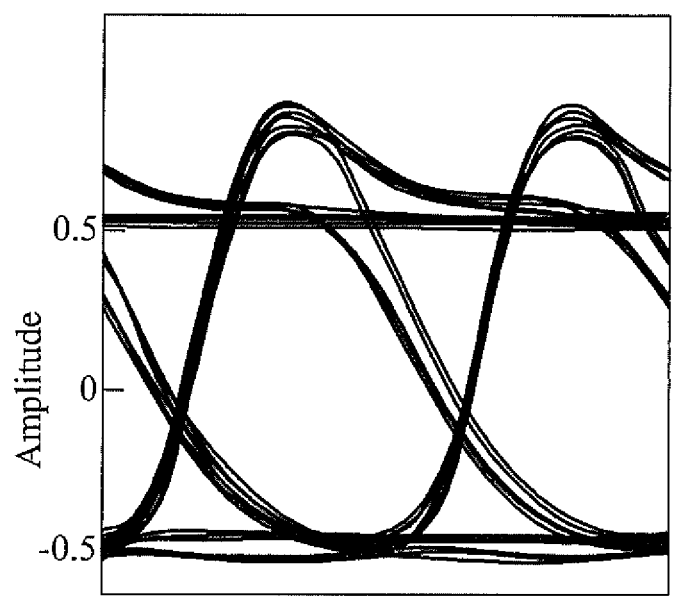
FIG. 12B shows the eye diagram with pre-compensation.
Figure 12C:
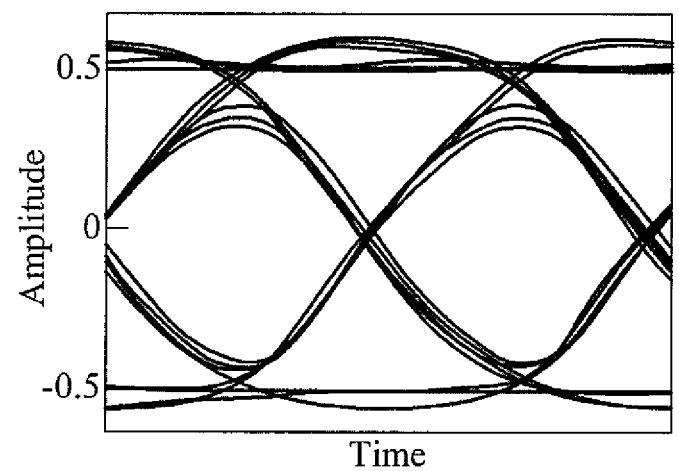
FIG. 12C shows the eye diagram with post-compensation.
Figure 12D:
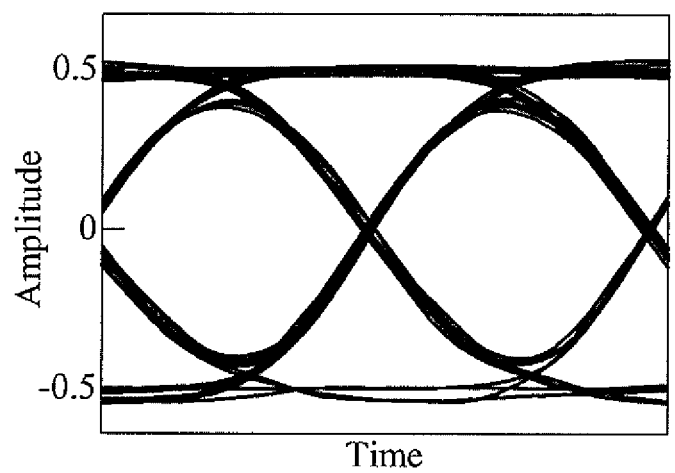
FIG. 12D shows the eye diagram with both compensation.

FIG. 12A shows the eye diagram without compensation, FIG. 12B shows the eye diagram with pre-compensation, FIG. 12C shows the eye diagram with post-compensation, and FIG. 12D shows the eye diagram with both compensation.

FIG. 12 shows the simulation result of the eye diagram at receiver. FIG. 12A shows the eye diagram at receiver without any compensation, FIG. 12B with pre-compensation, FIG. 12B with post-compensation and FIG. 12D with both pre-compensation and post-compensation. FIG. 12B shows that the pre-compensation may reduce the rabbit ear. In FIG. 12C and FIG. 12D, the post-compensation may eliminate the rabbit ear and tilting. Also, FIG. 12D shows much less jitter. When the pre-compensation and the post-compensation are both active, the chirp-dispersion may be completely compensated.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electronic dispersion compensation (EDC) system for low-cost a distributed feedback-directly modulated laser (DFB-DML), the EDC system comprising:
    a pre-compensating transmitter configured to transmit a signal with a reduced linear chirp-dispersion; and
    a post-compensating receiver configured to receive the signal and reduce a nonlinear chirp-dispersion,
    wherein the pre-compensating transmitter comprises a 2 tap data generator configured to generate a main-tap data and a pre-tap data, and
    wherein the pre-tap data is a predetermined cycle earlier generated data than the main-tap data.

2. The EDC system of claim 1, wherein the pre-compensating transmitter further comprises a rising pattern detector configured to receive the pre-tap data and the main-tap data, and generate a detector signal.

3. The EDC system of claim 2, wherein the detector signal is high when the main-tap data is low and the pre-tap data is high.

4. The EDC system of claim 2, wherein the pre-compensating transmitter further comprises pre-drivers configured to adjust amplitude of the detector signal according to an amount of pre-emphasis and subtract the detector signal from the main-tap data.

5. The EDC system of claim 4, wherein the pre-compensating transmitter further comprises an output driver configured to generate an output data, wherein the output data is pre-emphasized before a rising edge.

6. The EDC system of claim 4, wherein the rising pattern detector comprises combinational logic configured to pre-emphasize the output data.

7. The EDC system of claim 4, wherein the pre-compensating transmitter further comprises a pulse widening CLK generator configured to widen a pulse duration of at least one of the main-tap data and the pre-tap data.

8. The EDC system of claim 1, wherein the post-compensating receiver comprises filters configured to compensate a tilting of the nonlinear chirp-dispersion.

9. An electronic dispersion compensation (EDC) system for low-cost a distributed feedback-directly modulated laser (DFB-DML), the EDC system comprising:
    a pre-compensating transmitter configured to transmit a signal with a reduced linear chirp-dispersion; and
    a post-compensating receiver configured to receive the signal and reduce a nonlinear chirp-dispersion,
    wherein the post-compensating receiver comprises,filters configured to compensate a tilting of the nonlinear chirp-dispersion, and
    wherein the filters comprise, a low pass filter and an one-zero two-pole filter (1Z-2P filter) to compensate the tilting of the nonlinear chirp-dispersion.

10. A pre-compensating transmitter of EDC for low-cost a DFB-DML, the pre-compensating transmitter comprising:
    a 2 tap data generator configured to generate a main-tap data and a pre-tap data;
    a rising pattern detector configured to receive the pre-tap data and the main-tap data, and generate a detector signal;
    pre-drivers configured to adjust an amplitude of the detector signal according to an amount of pre-emphasis and subtract the detector signal from the main-tap data; and
    an output driver configured to generate an output data, wherein the output data is pre-emphasized before a rising edge.

11. The pre-compensating transmitter of claim 10, further comprises a pulse widening CLK generator configured to widen a pulse duration of at least one of the main-tap data and the pre-tap data.

12. A post-compensating receiver of EDC for low-cost a DFB-DML, the post-compensating receiver comprising:
    a linear equalizer configured to compensate a linear chirp-dispersion; and
    a nonlinear equalizer configured to compensate a tilting of a nonlinear chirp-dispersion,
    wherein the linear equalizer comprises zero-pole filter, and the nonlinear equalizer comprises a low pass filter, and an 1Z-2P filter.

* * * * *